United States Patent [19]

Kawahara et al.

[11] Patent Number: 4,516,141

[45] Date of Patent: May 7, 1985

[54] ELECTROSTATIC RECORDING APPARATUS

[75] Inventors: Yoshihiro Kawahara; Kiyoshi Hayashi, both of Osaka, Japan

[73] Assignee: Mita Industrial Company Limited, Osaka, Japan

[21] Appl. No.: 444,817

[22] Filed: Nov. 23, 1982

[30] Foreign Application Priority Data

Nov. 30, 1981 [JP] Japan .............................. 56-192383

[51] Int. Cl.³ ............................................ G01D 15/06

[52] U.S. Cl. ............................ 346/153.1; 355/14 SH

[58] Field of Search ..................... 346/153.1, 155, 150; 358/300; 355/3 SH, 14 SH

[56] References Cited

U.S. PATENT DOCUMENTS

| | | | |
|---|---|---|---|
| 3,896,451 | 7/1975 | Omi . | |
| 4,114,536 | 9/1978 | Kaneko et al. . | |
| 4,115,817 | 9/1978 | Suzuki et al. | 346/153.1 |
| 4,116,557 | 9/1978 | Kushima et al. . | |
| 4,131,358 | 12/1978 | Windele . | |
| 4,162,503 | 7/1979 | Potma et al. | 346/163 |
| 4,446,471 | 5/1984 | Yano | 346/153.1 |

*Primary Examiner*—Thomas H. Tarcza
*Attorney, Agent, or Firm*—Wenderoth, Lind & Ponack

[57] ABSTRACT

An electrostatic recording apparatus for recording, developing and fixing an image on a sheet of recording paper, comprises an electrostatic recording head and a roller. Transport structure is located at the down stream side of the electrostatic recording head with respect to a direction of feed of the sheet of recording paper. A control rotates the roller when a leading edge of the sheet of recording paper is sandwiched between the electrostatic recording head and the roller and stops rotation of the roller during a period of time after the leading edge of the sheet of recording paper which has passed through the electrostatic recording head and the roller has started being transported by the transport structure and before the trailing edge has passed between the electrostatic recording head and the roller, the roller being rotatable in response to feeding of the sheet after the roller has ceased to be driven.

8 Claims, 13 Drawing Figures

ELECTROSTATIC RECORDING APPARATUS

BACKGROUND OF THE INVENTION

1. Field of the Invention

The present invention relates to an electrostatic recording apparatus of the type in which an electrostatic image is recorded by an electrostatic recording head onto a sheet of recording paper as the latter travels between the electrostatic recording head and a roller, and the electrostatic image as recorded is then developed and fixed on the sheet of recording paper, and more particularly to an arrangement for driving the roller.

2. Description of the Prior Art

FIG. 1 shows a typical prior electrostatic recording apparatus. A rolled sheet 1 of recording paper is transported by a pair of transport rollers 2*a*, 2*b* so as to travel between an electrostatic recording head 3 and a roller 4, during which time an electrostatic image is formed on the continuous sheet 1 by the electrostatic recording head 3. The continuous sheet 1 with the electrostatic image thereon is caused by a pair of transport rollers 5*a*, 5*b* to pass through a cutter 6, and by a pair of transport rollers 7*a*, 7*b* to enter a development device 8, in which the electrostatic image is developed into a toner image. The toner image thus developed on the continuous sheet 1 is then fixed by a fixation device 9 . The continuous sheet 1 is thereafter discharged by a pair of discharge rollers 10*a*, 10*b* out of the electrostatic recording apparatus. The continuous sheet 1 is cut off at its trailing end by the cutter 6 when electrostatic recording by the electrostatic recording head 3 is completed.

The continuous sheet 1 is pressed against the electrostatic recording head 3 by the roller 4 as the continuous sheet 1 is fed along between the electrostatic recording head 3 and the roller 4 on driven rotation of the latter. When the roller 4 is accidentally driven to rotate with no recording paper present between the electrostatic recording head 3 and the roller 4, electrodes mounted on the electrostatic recording head 3 are liable to become damaged by frictional engagement with the roller 4. To eliminate such a problem, the cutter 6 is located at the downstream side of the electrostatic recording head 3 and the roller 4 with respect to the direction of feed of the continuous sheet 1, so that the continuous sheet 1 is interposed between the roller 4 and the electrostatic recording head 3 at all times to protect the electrodes on the electrostatic recording head 3 against contact with the roller 4. Such an arrangement however allows only a continuous roll of recording paper to be used in the electrostatic recording apparatus, and precut sheets of recording paper cannot be employed.

With the prior electrostatic recording apparatus, a portion of the continuous recording sheet which is coextensive with a distance W between the electrostatic recording head 3 and the cutter 6 becomes useless in the next cycle of copying operation since no electrostatic image whatsoever can be formed on such a sheet portion. The blank portion of the recording sheet must be severed by the cutter 6, which is required to be actuated to perform such paper cutting in a complex controlled operation.

It is accordingly an object of the present invention to provide an electrostatic recording apparatus having an electrostatic recording head which is protected against unwanted damage due to frictional contact with an associated roller.

Another object of the present invention is to provide an electrostatic recording apparatus capable of preventing generation of waste portions of recording paper, and recording electrostatic images on a roll of recording paper or on precut sheets of recording paper.

Still another object of the present invention is to provide an electrostatic recording apparatus which can print images on a roll of recording paper fully over its entire surface without giving rise to waste portions of the recording paper.

A still further object of the present invention is to provide an electrostatic recording apparatus which can record electrostatic images on sheets of recording paper having a variety of sizes.

SUMMARY OF THE INVENTION

To accomplish foregoing objectives, there is provided an electrostatic recording apparatus for recording, developing and fixing an image on a sheet of recording paper. The electrostatic recording apparatus comprises an electrostatic recording head for forming an electrostatic image on the sheet of recording paper, a roller engageable with the electrostatic recording head for pressing the sheet of recording paper against the electrostatic recording head to allow the electrostatic recording head to record an electrostatic image on the sheet of recording paper while the latter is being fed between the electrostatic recording head and the roller, transport means located at the downstream side of the electrostatic recording head with respect to a direction of feed of the sheet of recording paper and control means for rotating the roller when a leading edge of the sheet of recording paper is sandwiched between the electrostatic recording head and the roller and for stopping rotation of the roller during a period of time after the leading edge of the sheet of recording paper which has passed through the electrostatic recording head and the roller has started being transported by the transport means and before the trailing edge has passed between the electrostatic recording head and the roller, the roller being rotatable in response to feeding of the sheet after the roller has ceased to be driven.

The control means includes an electromagnetic clutch for transmitting rotative power to the roller. A detector is disposed at the upstream side of the electrostatic recording head with respect to the direction of feed of the sheet of recording paper for detecting the presence of the latter. The electromagnetic clutch is energized in response to detection of the sheet by the detector immediately before or when the leading edge of the sheet is sandwiched between the electrostatic recording head and the roller, and is de-energized during the period of time mentioned above.

According to another aspect of the invention, an electrostatic recording apparatus for recording, developing and fixing an image on a sheet of recording paper, comprises an electrostatic recording head for forming an electrostatic image on the sheet of recording paper, a roller engageable with the electrostatic recording head for pressing the sheet of recording paper against the electrostatic recording head to allow the electrostatic recording head to record an electrostatic image on the sheet of recording paper while the latter is being fed between the electrostatic recording head and the roller, and means for rotating the roller when a leading edge of the sheet of recording paper is sandwiched between the electrostatic recording head and the roller and for stopping rotation of the roller when the sheet of recording paper has passed between the electrostatic recording head and the roller.

The rotating means includes an electromagnetic clutch for transmitting rotative power to the roller. A detector is disposed at the upstream side of the electrostatic recording head with respect to the direction of feed of the sheet of recording paper for detecting the presence of the latter. The electromagnetic clutch is energized in response to detection of the sheet by the detector immediately before or when the leading edge of the sheet is sandwiched between the electrostatic recording head and the roller, and is de-energizable when the sheet of recording paper has passed between the electrostatic recording head and the roller. Since the roller is driven only when the sheet of recording paper is present between the electrostatic recording head and the roller, electrodes on the electrostatic recording head are prevented from being damaged by contact with the roller. The electrostatic recording apparatus of the invention can record electrostatic images on a roll of recording paper and on precuts sheets of recording paper.

The roller may comprise a first portion and at least one second portion. The first portion is able to be driven rotatably and be held against sheets of recording paper having various sizes, and the second portion is idly rotatable and is able to be selectively held freely rotatably against the electrostatic recording head or rotatably against at least one of the sheets of recording paper. This arrangement allows only that roller portion or those roller portions which press the sheet of recording paper against the electrostatic recording head to be driven, with the other roller portions which are in direct contact with the electrostatic recording head being at rest. Thus, the electrodes on the electrostatic recording head are not damaged. No waste recording paper will be produced which would otherwise be caused to prevent damage to the electrodes.

Where the sheet of recording paper is continuously supplied from a roll of recording paper, a cutter unit is disposed upstream of the electrostatic recording head and the roller with respect to the direction of feed of the sheet of recording paper for cutting off the sheet of recording paper.

The arrangement of the invention will not generate waste portions of recording paper.

BRIEF DESCRIPTION OF THE DRAWINGS

This invention will now be illustrated in more detail with reference to the accompanying drawings, wherein.

DETAILED DESCRIPTION OF THE PREFERRED EMBODIMENTS

The present invention will now be described with reference to the drawings which illustrate preferred embodiments of the present invention.

Figure 1:
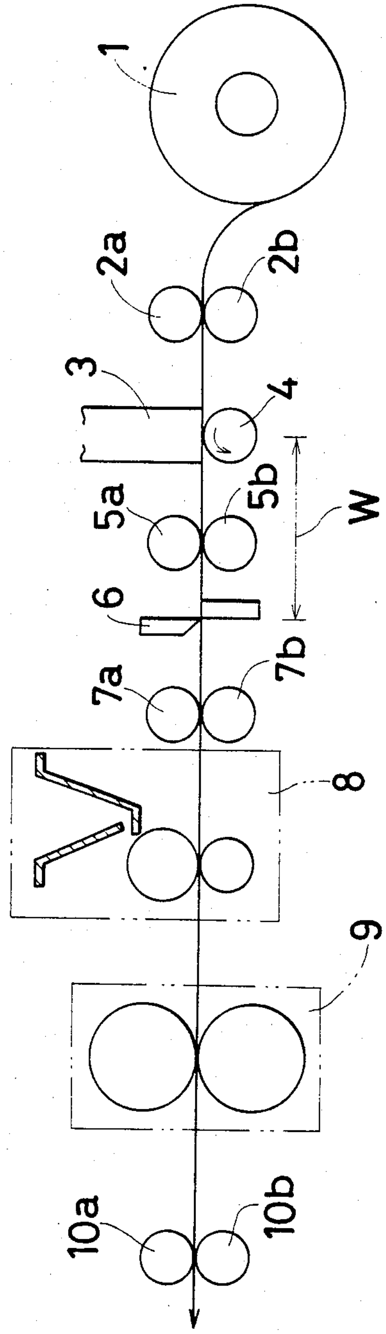
Fig. 1 Prior Art
FIG. 1 is a schematic diagram of a typical conventional electrostatic recording apparatus.
Figure 2:
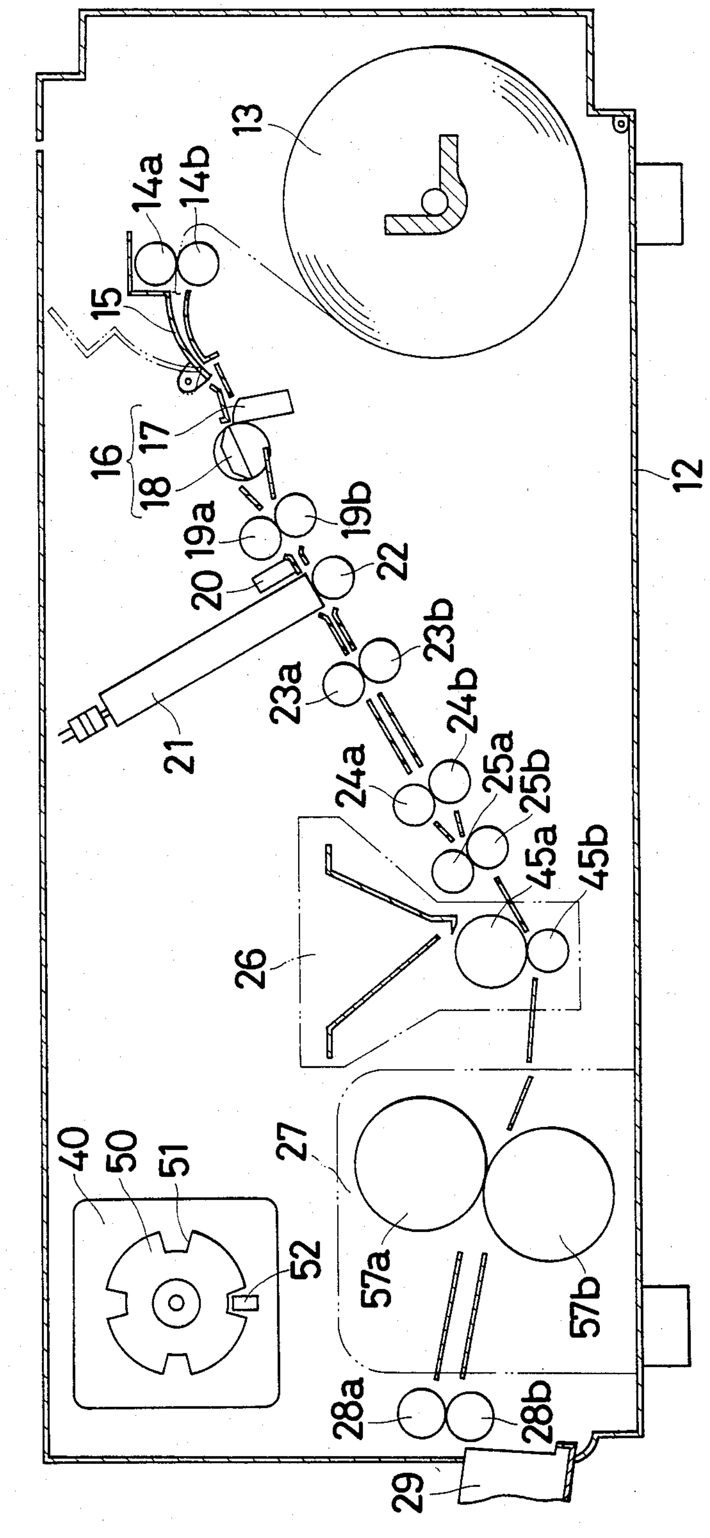
FIG. 2 is a longitudinal cross-sectional view of an electrostatic recording apparatus according to an embodiment of the present invention.

FIG. 2 is a longitudinal cross-sectional view of an embodiment of the present invention. An electrostatic recording apparatus has a machine frame 12 housing therein a roll 13 of recording paper from which a continuous sheet is unwound and fed by a pair of rollers 14*a*, 14*b* through a guide plate assembly 15 to a cutter unit 16. The cutter unit 16 is composed of a fixed blade 17 and a rotatable blade 18 which is angularly displaceable for coacting with the fixed blade 17 to cut off the continuous sheet 13 to a desired length. The cut sheet of recording paper is then transported past the cutter unit 16 by a pair of rollers 19*a*, 19*b* and between an electrostatic recording head 21 and a roller 22 after a leading edge of the sheet has been detected by a detector 20. The sheet is then fed by pairs of rollers 23*a*, 23*b*; 24*a*, 24*b*; 25*a*, 25*b* into a development device 26. While the sheet passes between the electrostatic recording head 21 and the roller 22, an electrostatic image is formed on the sheet. The formed electrostatic image is subsequently developed into a toner image by the development device 26. The developed toner image is fixed to the sheet by a pressure fixation device 27. The sheet with the toner image fixed thereto is finally discharged by a pair of discharge rollers 28*a*, 28*b* out of the machine frame 12 into a tray 29.

Figure 3:
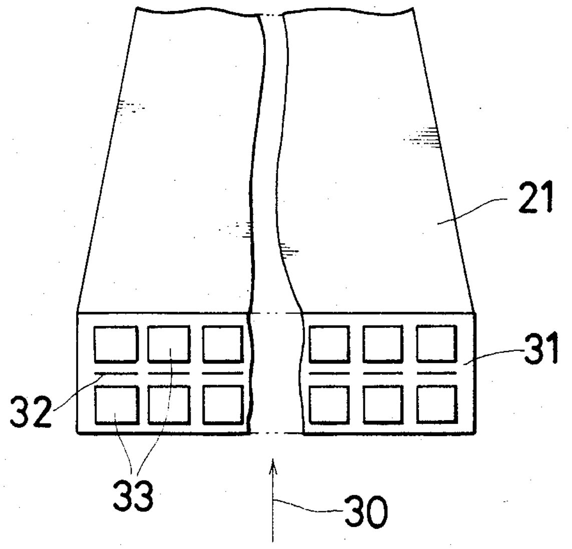
FIG. 3 is a fragmentary perspective view of an electrostatic recording head as seen from below when the head is positioned in its normal disposition.

As shown in FIG. 3, the electrostatic recording head 21 has on its lower surface facing the roller 22 an array of needle-shaped electrodes 32 and two arrays of auxiliary electrodes 33, the electrode arrays extending transversely across a direction (as shown by the arrow 30) of feed of the sheet of recording paper, or extending normally to the sheet of FIG. 2.

Figure 4:
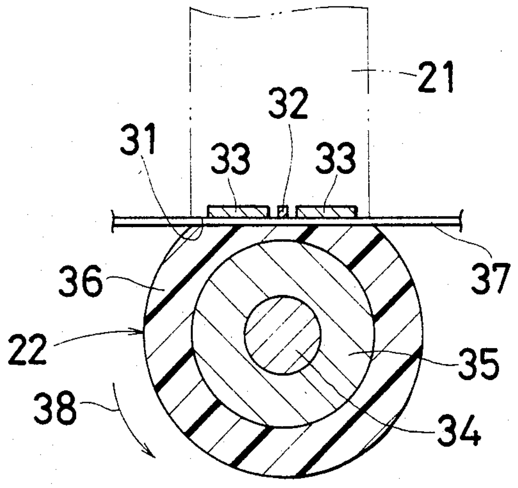
FIG. 4 is a transverse cross-sectional view of the electrostatic recording head and a roller.

The sheet of recording paper as it is fed along is sandwiched between the electrostatic recording head 21 and the roller 22 while an electrostatic image is being formed on the sheet, as illustrated in FIG. 4. The roller 22 includes a rotatable shaft 34, a cylindrical sleeve 35 fixedly fitted therearound, and a cylindrical cover layer 36 made of elastic material such as spongy resin and extending around the cylindrical sleeve 35. The sheet of recording paper, which is designated by the reference numeral 37 in FIG. 4, is pressed against the surface 31 of the electrostatic recording head 21 by the cover layer 36 while the electrostatic image is being formed on the sheet 37. The roller 22 is caused to rotate in the direction of the arrow 38 by the advancing movement of the sheet 37.

Figure 5:
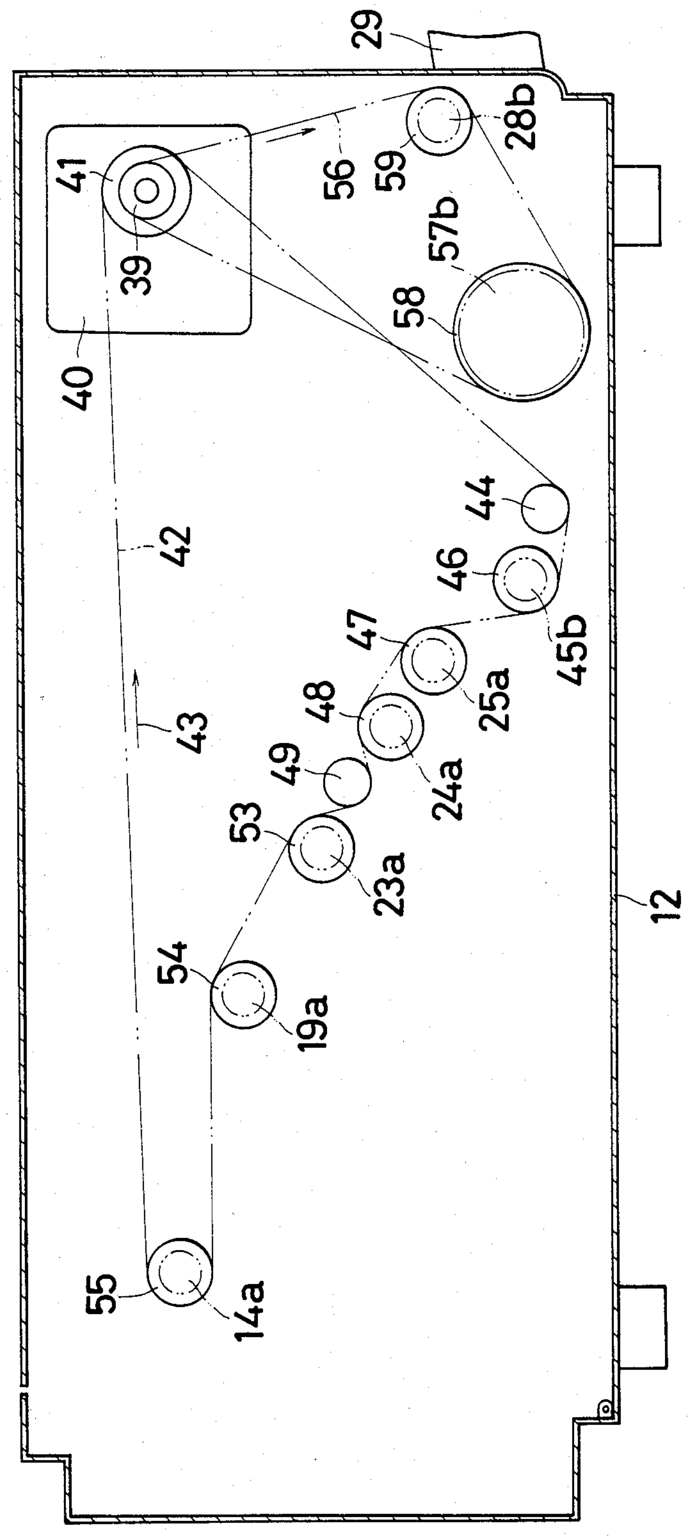
FIG. 5 is a longitudinal cross-sectional view of the electrostatic recording apparatus shown in FIG. 2 as seen from behind the same.

FIG. 5 is illustrative of a system for driving the electrostatic recording apparatus. The driving system comprises a motor 40 having an output shaft on which there is fixedly mounted a sprocket wheel 41 with an endless chain 42 travelling therearound. When the motor 40 is energized, the endless chain 42 is driven to travel in the direction of the arrow 43. The endless chain 42 also extends around an idler sprocket wheel 44, a sprocket wheel 46 fixed to one (45*b*) of a pair of rollers 45*a*, 45*b* in the development device 26 (FIG. 2), a sprocket wheel 47 fixed to the roller 25*a*, a sprocket wheel 48 fixed to the roller 24*a*, a tension sprocket wheel 49, a sprocket wheel 53 fixed to the roller 23*a*, a sprocket wheel 54 fixed to the roller 19*a*, and a sprocket wheel 55 fixed to the roller 14*a*. The output shaft of the motor 40 has another sprocket wheel 39 around which an endless chain 56 travels. The endless chain 56 extends around a sprocket wheel 58 fixed to one (57*b*) of a pair of fixation rollers 57*a*, 57*b* in the pressure fixation device 27 and a sprocket wheel 59 fixed to the discharge roller 28*b*. As shown in FIG. 2, the speed of rotation of the motor 40 for feeding the sheet of recording paper through an interval can be detected by a photodetector 52 for detecting recesses 51 defined at intervals in the edge of a light shield disc 50 drivable by the motor 40.

Figure 6:
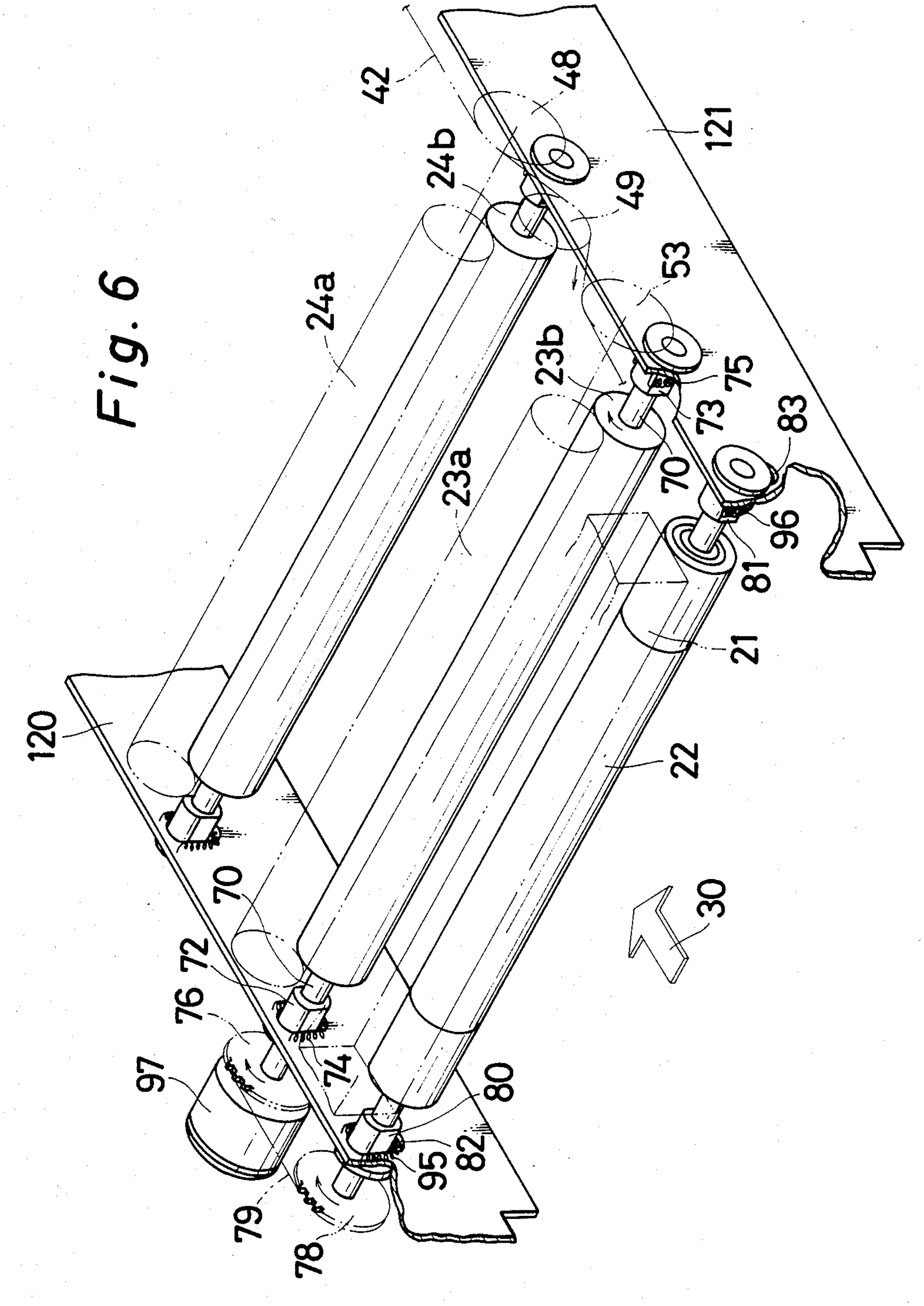
FIG. 6 is an enlarged fragmentary perspective view of the electrostatic recording head, the roller and other nearby components.
Figure 7:
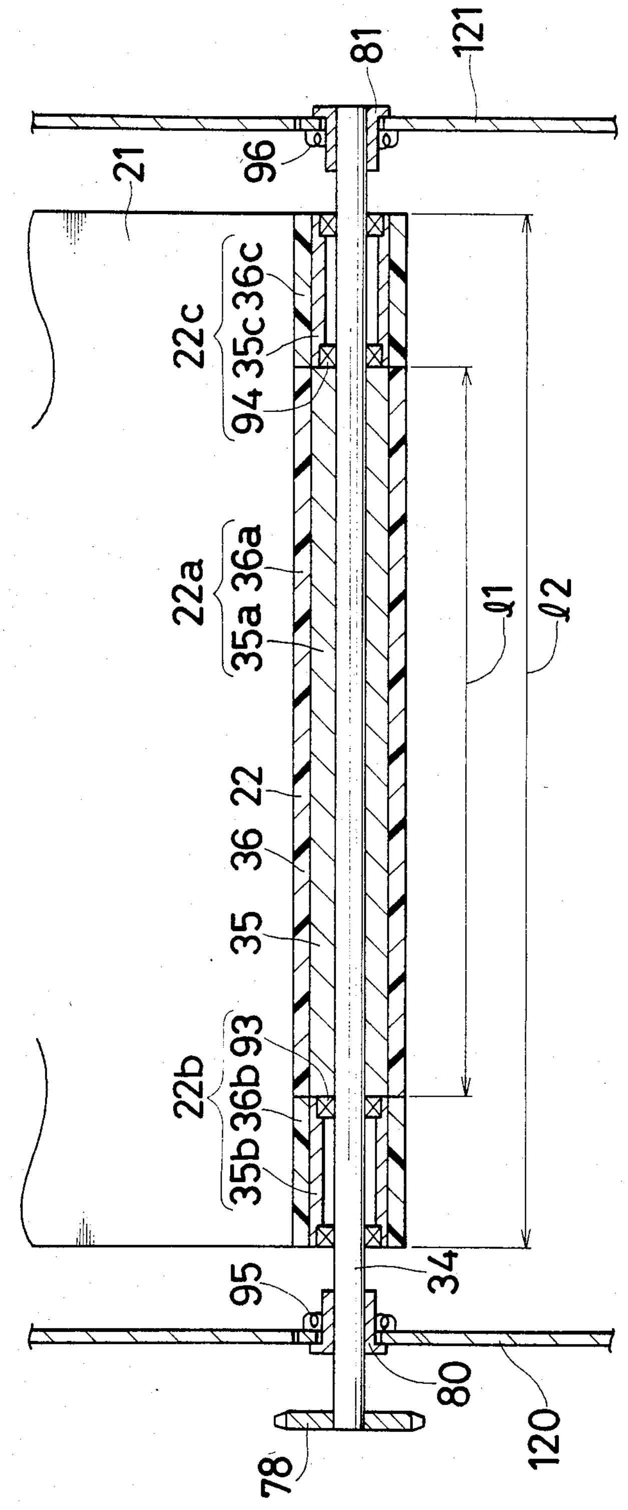
FIG. 7 is a longitudinal cross-sectional view of the roller illustrated in FIG. 6.
Figure 8:
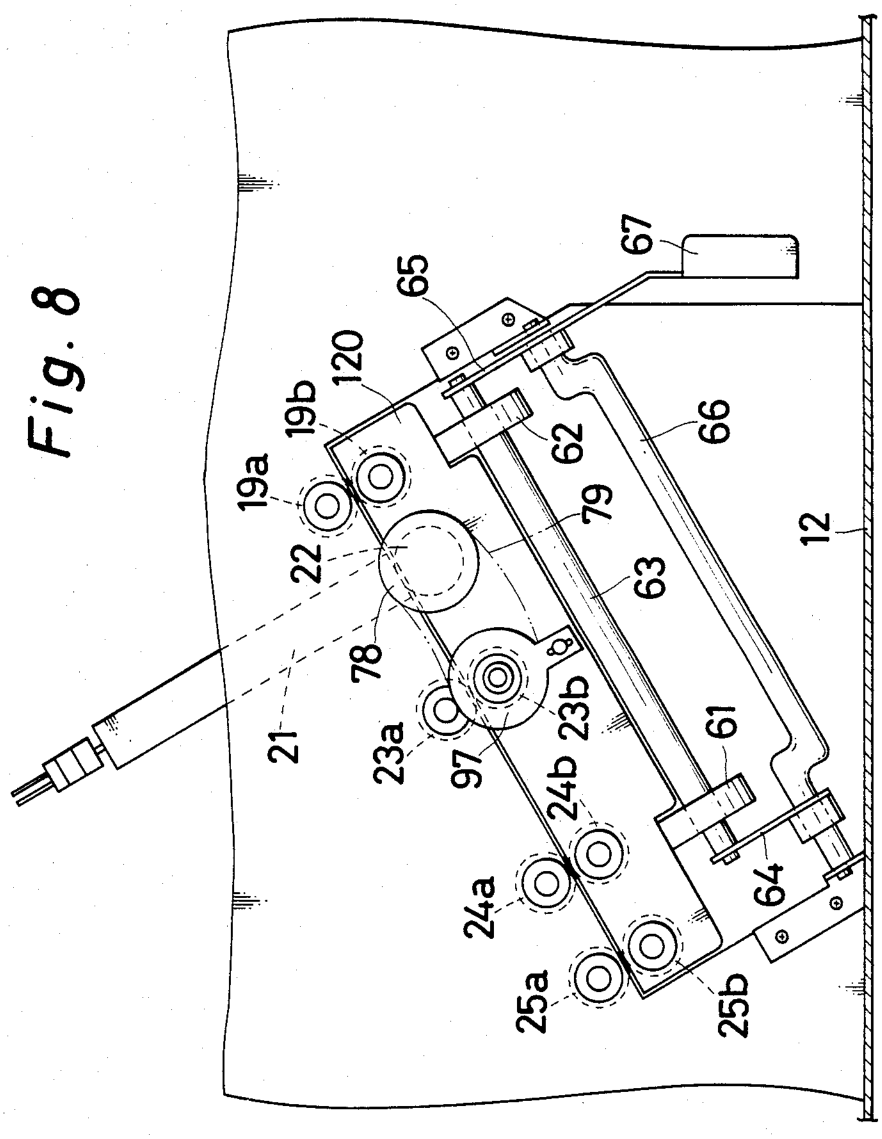
FIG. 8 is a front elevational view of the electrostatic recording head, the roller and the other components.
Figure 9:
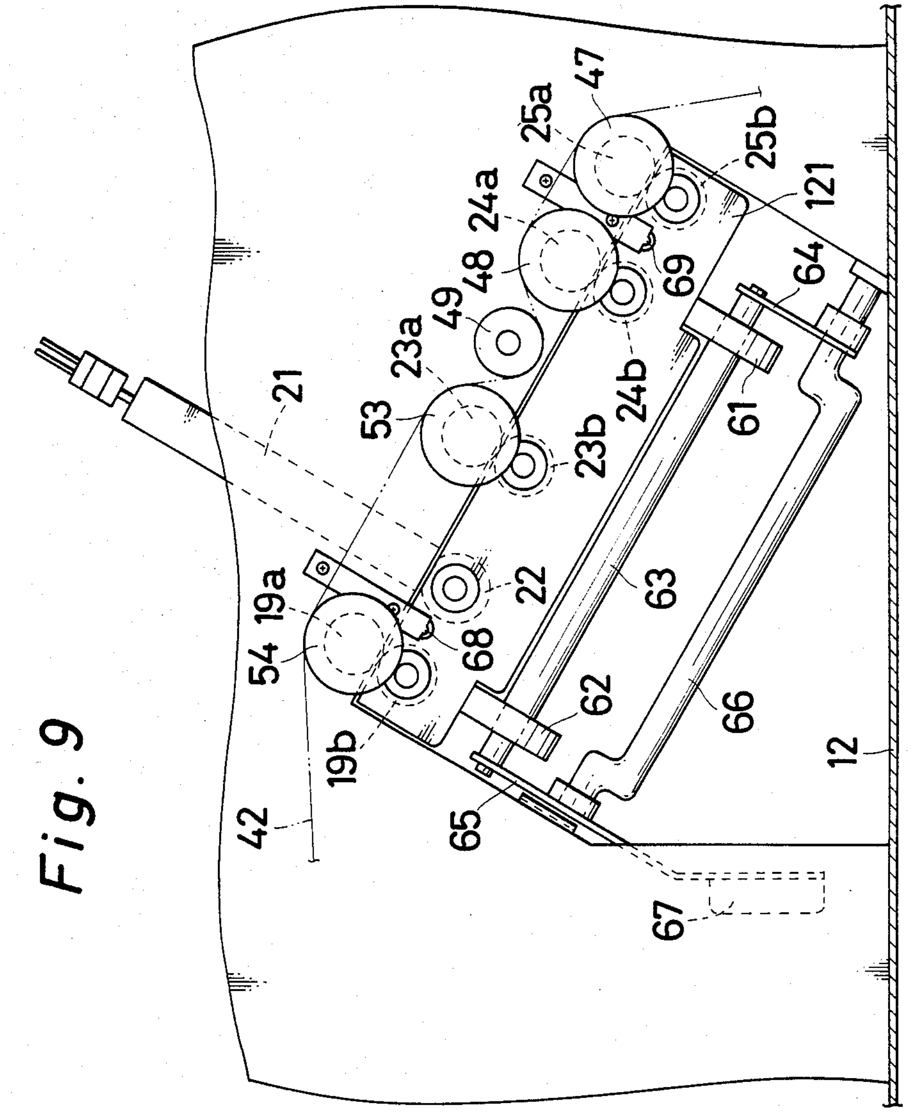
FIG. 9 is a rear elevational view of the electrostatic recording head, the roller and the other components.

In FIGS. 6 through 9, the rollers 22,23*b*,24*b*,25*b* are rotatably supported by and between a pair of support plates 120, 121. The rollers 23*a*, 24*a*, 25*a* which are pressable against the rollers 23*b*, 24*b*, 25*b*, respectively, are rotatably supported by and between side plates of the machine frame 12. As illustrated in FIG. 8, the support plate 120 is engageable with a pair of rollers 61, 62 rotatably mounted on a shaft 63 supported on a pair of arms 64, 65 which are angularly movably mounted by a rod 66 on the machine frame 12. The arm 65 has a handle 57. The support plate 121 has an upper edge portion supported by a pair of hooks 68, 69 fastened to one of the side plates of the machine frame 12 for angular displacement about an axis extending parallel to the direction in which the sheet of recording paper is fed, that is, parallel to the plane of FIG. 9. The parts are shown in FIGS. 8 and 9 as being ready for recording an image on the sheet of recording paper and transporting the latter. When the sheet of recording paper is jammed, the handle 67 is turned about the rod 66 to angularly displace the arms 64, 65 to move the rollers 61, 62 out of contact with the support plate 120, which is then angularly displaced about the hooks 68, 69 into a downward position as shown in FIG. 8. The jammed sheet can thereafter be taken out of the machine frame 12. The illustrated arrangement thus allows easy maintenance.

The roller 23*b* is supported on a rotatable shaft 70 journalled at end portions thereof in a pair of bearings 72, 73 loosely fitted respectively in the support plates 120, 121 for slight vertical displacement with respect to the support plates 120, 121. The bearings 72, 73 are normally urged upward by springs 74, 75, respectively, relative to the support plates 120, 121 so that the roller 23*b* can be resiliently held against the roller 23*a*. The rollers 19*b*, 24*b*, 25*b* are similarly arranged so that they can be resiliently held against the rollers 19*a*, 24*a*, 25*a*, respectively. A sprocket wheel 76 is affixed to one end of the shaft 70 through a bearing 98 (FIG. 10), and a sprocket wheel 78 is affixed to one end of the shaft 34 of the roller 22. An endless chain 79 is trained around the sprocket wheel 76 and the sprocket wheel 78. The shaft 34 of the roller 22 is journalled at end portions thereof in a pair of bearings 80, 81 loosely disposed respectively in a pair of slots 82, 83 defined in the support plates 120, 121, respectively, and having longitudinal axes parallel to the electrostatic recording head 21.

The bearings 80, 81 for the roller 22 extend respectively through the slots 82, 83 and are displaceable toward and away from the electrostatic recording head 21. The bearings 80, 81 are urged respectively by springs 95, 96 toward the surface 31 of the electrostatic recording head 21. The cylindrical cover layer 36 of the roller 22 serves to press the sheet of recording paper against the surface 31 of the electrostatic recording head 21. When no sheet of recording paper is present between the electrostatic recording head 21 and the roller 22, the cylindrical cover layer 36 is resliently held in contact with the surface 31 of the electrostatic recording head 21. Rotative power from the shaft 70 is transmitted through an electromagnetic clutch 97 to the sprocket wheel 76, from which the power is transmitted through the chain 79 to the sprocket wheel 78.

Figure 10:
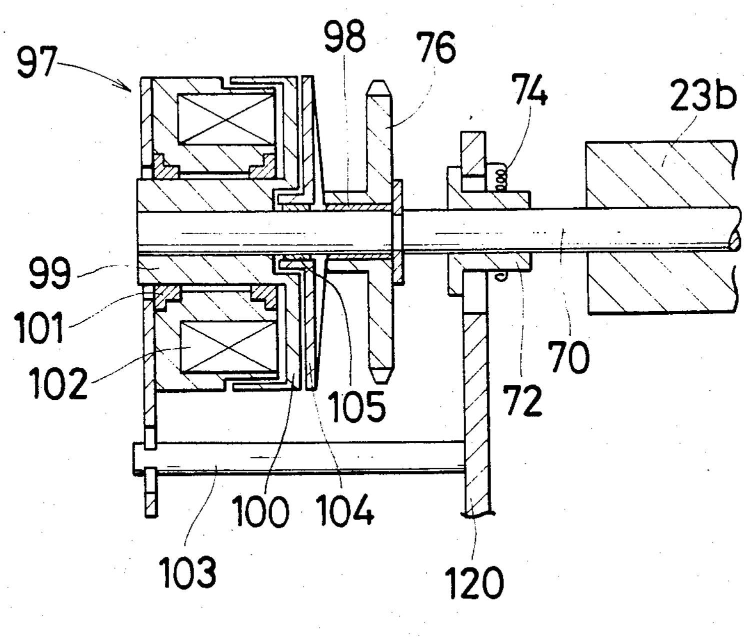
FIG. 10 is a cross-sectional view of an electromagnetic clutch.

FIG. 10 shows, in cross section, the electromagnetic clutch 97 illustrated in FIG. 6. The sproket wheel 76 is supported by the bearing 98 on the shaft 70. To the shaft 70, there is secured a boss 99 having a flange 100. A solenoid 102 is disposed around the boss 99 with a bearing 101 interposed therebetween. The solenoid 102 is fixed by a stay 103 to the support plate 120. A magnetically attractable plate 104 is mounted on a bearing 105 for rotation relative to the shaft 70 and is coupled to the sprocket wheel 76 to prevent relative angular displacement therebetween about their common axis. When the solenoid 102 is energized, the magnetically attractable plate 104 is magnetically attracted to the flange 100, whereupon rotative power from the shaft 70 is transmitted through the flange 100 and the magnetically attractable plate 104 to the sprocket wheel 76. On de-energization of the solenoid 102, the power flow from the flange 100 to the magnetically attractable plate 104 is cut off, thus stopping rotation of the sprocket 76.

As illustrated in FIG. 7, the roller 22 is composed of a central portion 22*a* and a pair of end portions 22*b*, 22*c* disposed axially one on each side of the central portion 22*a*. The central portion 22*a* comprises a cylindrical sleeve 35*a* secured fitted over the shaft 34 and a cylindrical cover layer 36*a* made of a flexible material such as spongy rubber and fitted over the sleeve 35*a*. The end portion 22*b* has a cylindrical sleeve 35*b*, a cylinderical cover layer 36*b* fitted over the sleeve 35*b*, and a pair of bearings 93 supporting the sleeve 35*b* rotatably around the shaft 34. Likewise, the end portion 22*c* comprises a cylindrical sleeve 35*c*, a cylinderical cover layer 36*c* fitted over the sleeve 35*c*, and a pair of bearings 94 supporting the sleeve 35*c* rotatably around the shaft 34. The sleeves 35*a*, 35*b*, 35*c* jointly constitute the sleeve 35, and the layers 36*a*, 36*b*, 36*c* jointly constitute the layer 36, as shown in FIG. 4.

The sheet of recording paper is fed along between the electrostatic recording head 21 and the roller 22 with the transverse center of the sheet being aligned with the axial center of the roller 22. The central roller portion 22*a* has an axial length l1 selected to cover the widths of the Japanese Industrial Standards sizes A4 and A5 so that the sheets of such sizes will be transported fully in contact with the central portion 22*a* over the length l1. During an electrostatic image recording operation, the end portions 22*b*, 22*c* are held against the surface 31 of the electrostatic recording head 21, but are prevented from rotating by the bearings 93, 94 to thereby protect the needle-shaped electrodes 32 and the auxiliary electrodes 33 against damage due to frictional contact with the end portions 22*b*, 22*c*. The combined length l2 of the roller portions 22*a*, 22*b*, 22*c* is selected to cover the widths of the Japanese Industrial Standards sizes B4 and B5. The sheets having such sizes can be fed along in contact with the roller portions 22*a*, 22*b*, 22*c* fully over the length l2. When B4 and B5 size sheets are transported, they are held in contact with the end portions 22*b*, 22*c*, which are caused to rotate. The sheet of recording paper can therefore be held reliably against the surface 31 of the electrostatic recording head 21. Where the sheet is of A4 or A5 size, the end portions 22*b*, 22*c* remain at rest and the needle-shaped electrodes 32 and auxiliary electrodes 33 of the electrostatic recording head 21 will be free from any damage which would otherwise result from frictional contact with the end portions 22*b*, 22*c* of the roller 22.

In operation for electrostatic image recording, when the leading edge of the continuous sheet 13 at the cutter unit 16 is sandwiched between the electrostatic recording head 21 and the roller 22 by actuation of the motor 40, or is moved to a position just in front of the electrostatic recording head 21 and the roller 22, the detector 20 detects the leading edge of the continuous sheet 13, whereupon the solenoid 102 of the electromagnetic clutch 97 is energized. The sprocket wheel 76 is now driven to cause the chain 79 to rotate the sprocket wheel 78, thereby rotating the shaft 34 of the roller 22. While the sheet is fed along as it is sandwiched between the electrostatic recording head 21 and the roller 22, an image is electrostatically formed on the sheet. After the leading edge of the sheet which has passed through the electrostatic recording head 21 and the roller 22 has been gripped by the rollers 23*a*, 23*b*, and when the trailing edge of the sheet as cut off by the cutter unit 16 has moved past the electrostatic recording head 21 and the roller 22, the solenoid 102 of the electromagnetic clutch 97 is de-energized. Where the sheet of recording paper as being transported is of size A4 or A5, it is pressed against the surface 31 of the electrostatic recording head 21 and the end portions 22*b*, 22*c* are also pressed against the surface 31 as they are held at rest against rotation. Therefore, there is no danger that the needle-shaped electrodes 32 and the auxiliary electrodes 33 will be damaged. After the sheet has passed between the electrostatic recording head 21 and the roller 22, the roller 22 is brought to a stop, so that the needle-shaped electrodes 32 and the auxiliary electrodes 33 can be protected against damage in any way.

Figure 11:
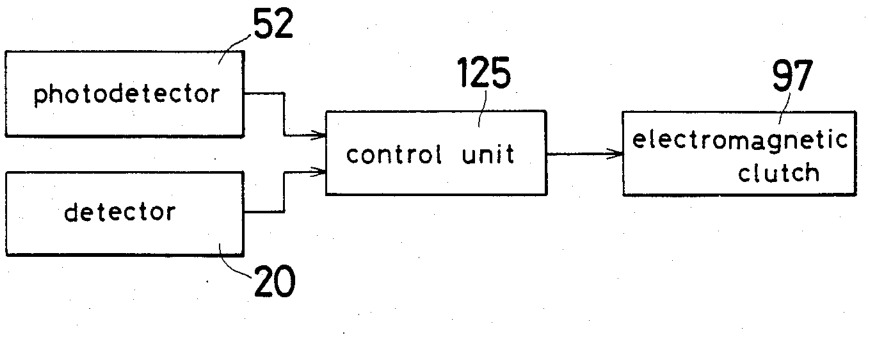
FIG. 11 is a block diagram of a circuit for controlling the electromagnetic clutch and a cutter unit.

FIG. 11 shows a circuit arrangement for controlling the cutter unit 16 and the electromagnetic clutch 97. When the detector 20 detects the leading edge of the sheet 13 as it is sandwiched between the electrostatic recording head 21 and the roller 22 or as it reaches a position immediately in front of the electrostatic recording head 21 and the roller 22, a control unit 125 energizes the solenoid 102 of the electromagnetic clutch 97 and keeps on energizing the solenoid 102.

After the leading edge of the sheet 13 has been sandwiched between and transported by the rollers 23*a*, 23*b*, the control unit 125 actuates the cutter unit 16. The solenoid 102 is continuously kept de-energized until trailing edge of the sheet 13 as severed by the cutter unit 16 moves past the electrostatic recording head 21 and the roller 22.

Figure 12:
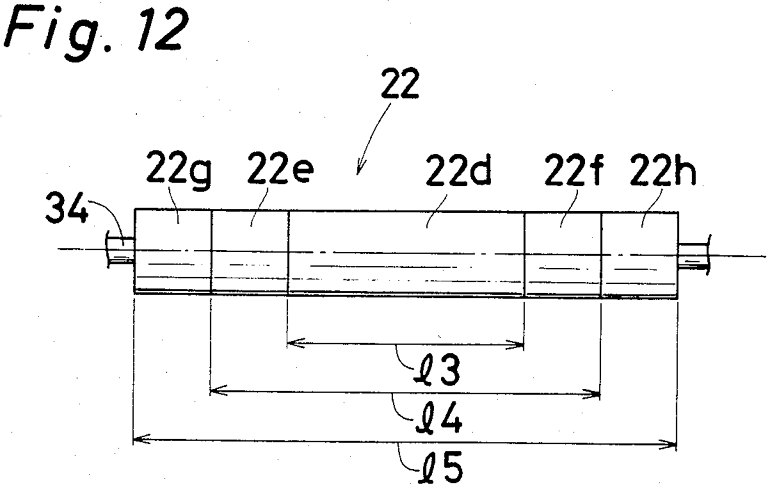
FIG. 12 is a plan view of a roller according to another embodiment of the present invention.

FIG. 12 illustrates a roller 22 according to another embodiment of the invention. The roller 22 is composed of portions 22*d* through 22*h* arranged in the axial direction thereof, the central portion 22*d* being fixed to a rotatable shaft 34. The roller portions 22*e* through 22*h* are of the same construction as that of the roller portions 22*b*, 22*c* (FIG. 7) such that the roller portions 22*e* through 22*h* will be rotatable with respect to the shaft 34. The central portion 22*d* has a length l3; the central portion 22*d* and the portions 22*e*, 22*f* have a total length l4; and the portions 22*d* through 22*h* have a total length l5. When sheets having widths corresponding to the lengths l3, l4, l5, respectively, are transported during electrostatic image recording, the shaft 34 and hence the central portion 22*d* are driven to rotate at all times. More specifically, when a sheet having the minimum width in conformity with the length l3 is transported, the roller portions 22*e* through 22*h* remain nonrotated in pressed engagement with the surface 31 of the electrostatic recording head 21. When a sheet wide enough to cover the length l4 is fed along, the roller portions 22*e*, 22*f* are rotated by the travelling sheet while the roller portions 22*g*, 22*h* remain at rest and are held against the surface 31 of the electrostatic recording head 21. When a sheet having a width corresponding to the length l5 is transported, the roller portions 22*e* through 22*h* are caused to rotate by the sheet as it is fed along. The rotating roller portions 22*d* through 22*h* are held in contact with the sheet of recording paper, but out of direct contact with the surface 31 of the electrostatic recording head 21. Since the roller portions 22*e* through 22*h* are selectively held nonrotatively in abutment against the surface 31 of the electrostatic recording head 21 when the sheets have the widths corresponding to the lengths l3 and l4, the needle-shaped electrodes 32 and auxiliary electrodes 33 of the electrostatic recording head 21 are prevented from being damaged by the roller 22.

Figure 13:
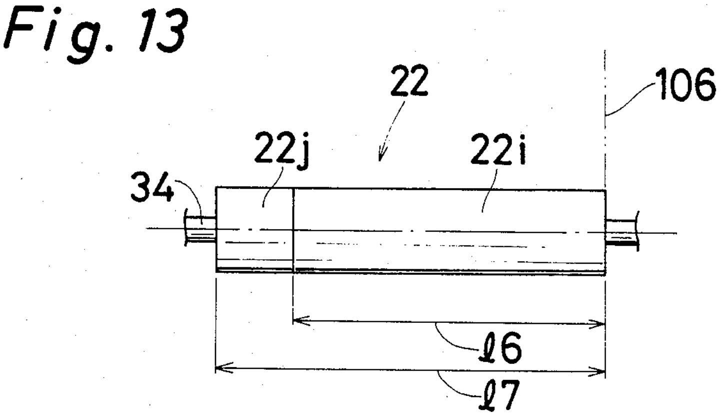
FIG. 13 is a plan view of a roller according to still another embodiment of the present invention.

FIG. 13 is illustrative of another roller 22 constructed in accordance with still another embodiment of the invention. The roller 22 is composed of a first portion 22*i* secured to a rotatable shaft 34 and a second portion 22*j* rotatable with respect to the shaft 34 and supported in the same manner as that in which the roller portions 22*b*, 22*c*, 22*e* through 22*h* (FIGS. 7 and 12) are supported. Sheets of recording paper having various sizes are transported with their one edge aligned with an imaginary reference line 106 at one end of the first portion 22*i* remote from the second portion 22*j*. When a sheet being fed along has a width equal to the length l6 of the first portion 22*i*, the second portion 22*j* is held at rest against the surface 31 of the electrostatic recording head 21. When a sheet having a width corresponding to the combined length l7 of the first and second portions 22*i*, 22*j* is transported, the second portion 22*j* is caused to rotate by travelling movement of the sheet. Accordingly, the roller 22 illustrated in FIG. 13 is effective to protect the needle-shaped electrodes 32 and auxiliary electrodes 33 of the electrostatic recording head 21 against any damage due to frictional contact with the roller 22.

As another arrangement, the control circuit 125 may energize the solenoid 102 of the electromagnetic clutch 97 to rotate the roller 22 when or just before the leading edge of the sheet of recording paper is sandwiched between the electrostatic recording head 21 and the roller 22. The control unit 125 may then de-energize the solenoid 102 to stop the roller 22 in response to movement of the trailing edge of the sheet past the electrostatic recording head 21 and the roller 22.

The electromagnetic clutch 97 may be dispensed with, and separate drive means may be provided for rotating the roller 22. The drive means may be controlled to determine the timing of rotation of the roller 22.

The electrostatic recording apparatus can use precut sheets of recording paper as well as the roll 13 of recording paper. Where precut sheets of recording paper are employed, the cutter unit 16 may be dispensed with.

Although certain preferred embodiments have been shown and described, it should be understood that many changes and modifications may be made therein without departing from the scope of the appended claims.

What is claimed is:

1. An electrostatic recording apparatus for recording an image on a sheet of recording paper, said apparatus comprising:

an electrostatic recording head for forming an electrostatic image on a sheet of recording paper;

a roller engageable with said electrostatic recording head for pressing the sheet of recording paper against said electrostatic recording head to allow said electrostatic recording head to record an electrostatic image on the sheet of recording paper while the latter is being fed between said electrostatic recording head and said roller;

transport means, located at the downstream side of said electrostatic recording head with respect to the direction of feed of the sheet of recording paper for transporting the sheet of recording paper;

detector means, positioned at the upstream side of said electrostatic recording head with respect to the direction of feed of the sheet of recording paper, for detecting the presence of the latter; and means, operable in response to said detector means, for rotating said roller immediately when or just before a leading edge of the sheet of recording paper is determined by said detector means to be sandwiched between said recording head and said roller, whereby the sheet is transported between said recording head and roller by said roller, and for stopping rotation of said roller during a period of time after said leading edge of the sheet of recording paper has passed from between said recording head and said roller and has started being transported by said transport means and before the trailing edge of the sheet has been determined by said detector means to have passed between said recording head and said roller, whereafter said roller then is rotated by the sheet being pulled by said transport means.

2. An apparatus as claimed in claim 1, wherein said means comprises an electromagnetic clutch operable by said detector means to be energized in response to detection of the leading edge of the sheet immediately before or when said leading edge of the sheet is sandwiched between said recording head and said roller, and to be de-energized during said period of time.

3. An apparatus as claimed in claim 2, wherein said clutch is coupled between said transport means and said roller, such that upon energization of said clutch, said roller is rotated by said transport means.

4. An apparatus as claimed in claim 1, wherein said roller comprises a first length portion and at least one second length portion mounted for free idling rotation relative to said first length portion, and said rotating means is coupled to said first length portion, such that when the sheet of recording paper has a width equal to the length of said first length portion and said first length portion is rotated, said second length portion is held stationary against said recording head, and when the sheet of recording paper has a width greater than the length of said first length portion and said first length portion is rotated, said second length portion is pressed against the sheet of recording paper and caused to rotate thereby.

5. An apparatus as claimed in claim 4, wherein said first length portion has at opposite axial ends thereof respective said second length portions, and the sheet of recording paper is aligned with the center line thereof passing along the axial center position of said roller.

6. An apparatus as claimed in claim 4, wherein said second length portion is positioned at a first axial end of said first length portion, a second axial end of said first length portion comprises a respective end of said roller, and the sheet of recording paper is aligned with one edge thereof passing along said roller end.

7. An apparatus as claimed in claim 1, wherein the sheet of recording paper is supplied from a continuous roll, and further comprising cutter means positioned upstream of said recording head and said roller, with respect to the direction of feed of the sheet of recording paper, for cutting the sheet of recording paper from the roll.

8. An apparatus as claimed in claim 1, wherein the sheet of recording paper is supplied from a supply of sheets of precut length.

* * * * *